May 7, 1935.  F. F. KLETT  2,000,234
CAPSULE MAKING MACHINE
Filed March 22, 1934  2 Sheets-Sheet 1
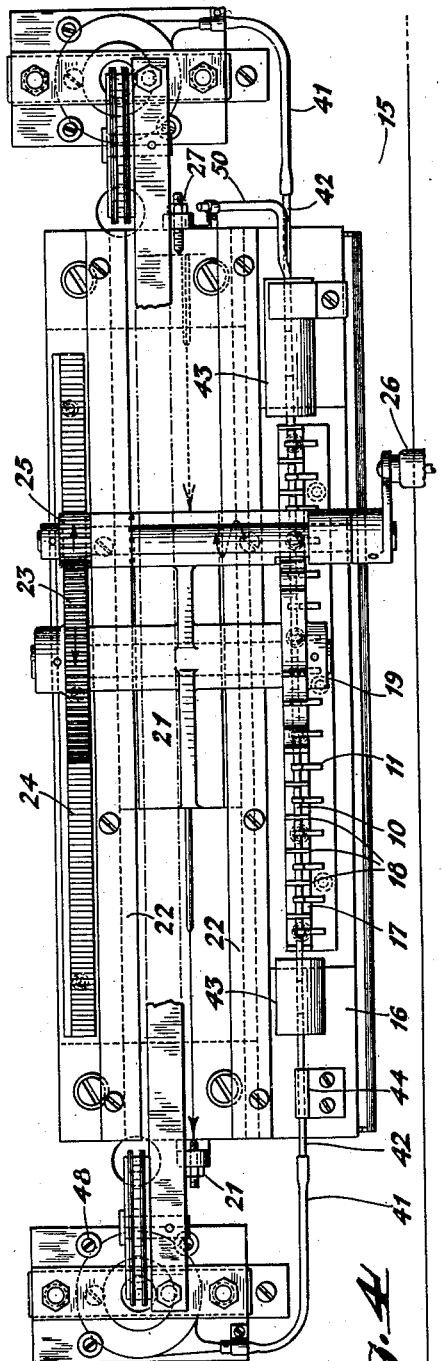
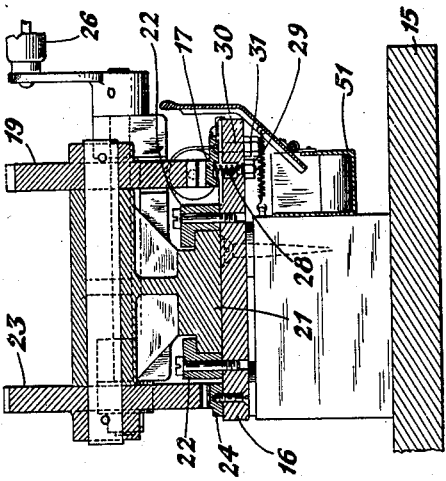
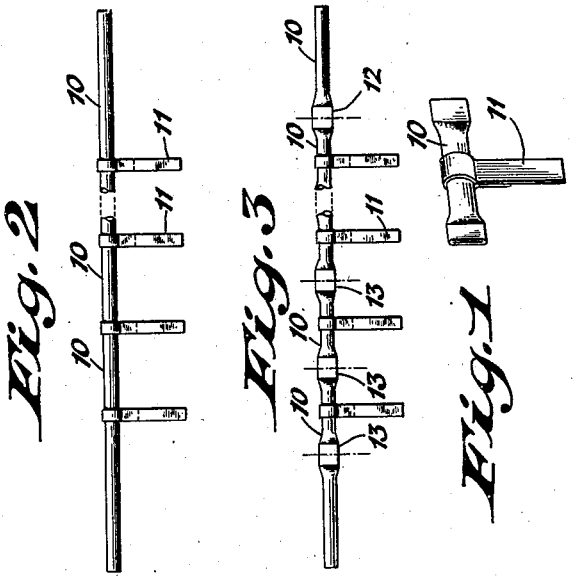
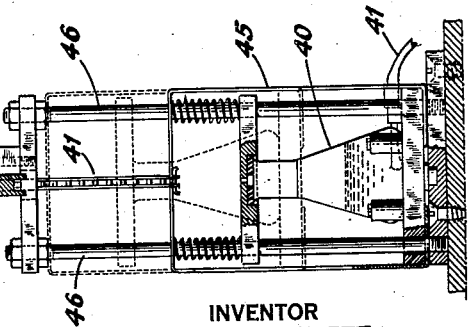
INVENTOR
FRED F. KLETT
BY
ATTORNEY May 7, 1935. F. F. KLETT 2,000,234
CAPSULE MAKING MACHINE
Filed March 22, 1934 2 Sheets-Sheet 2
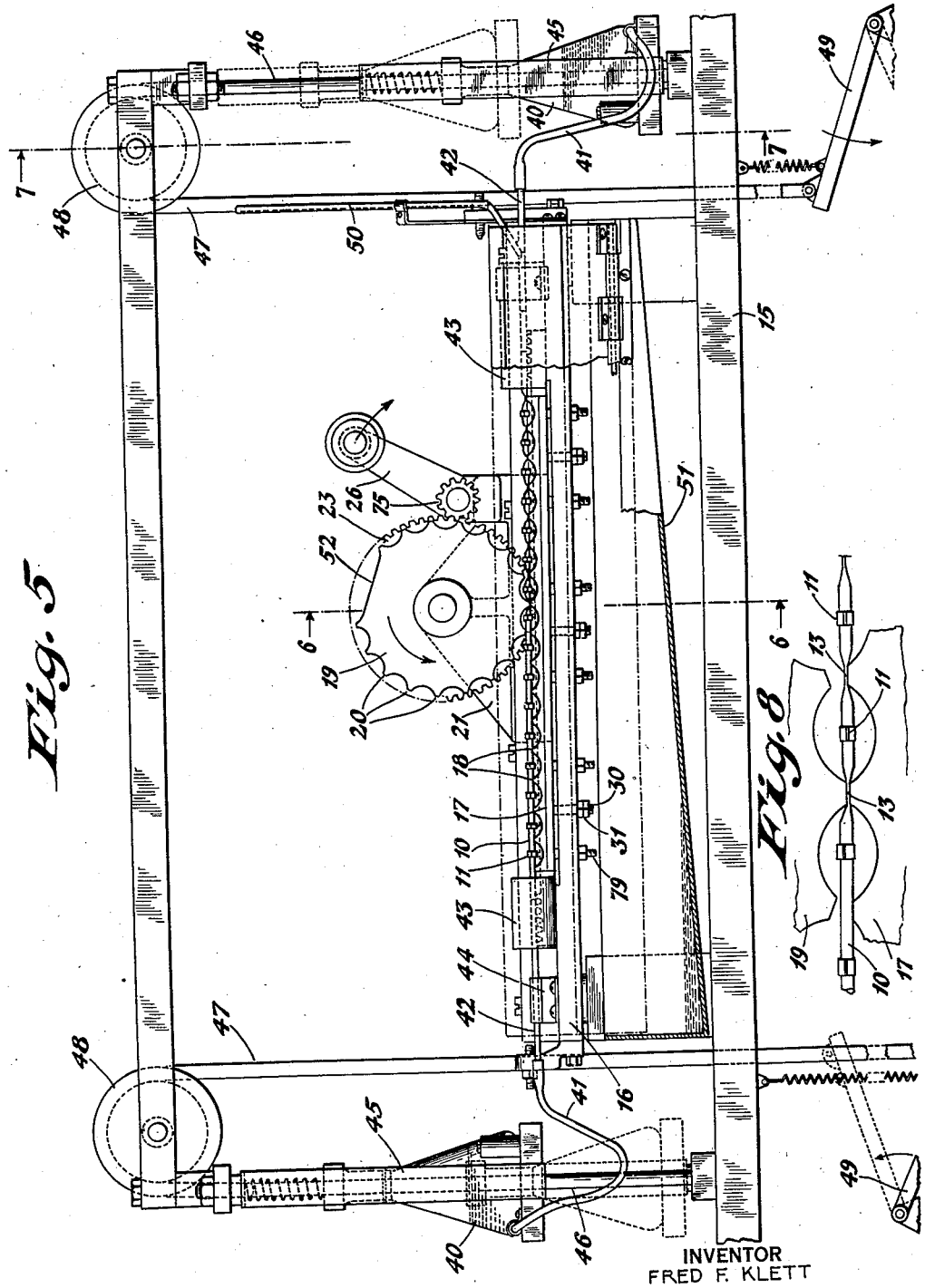
INVENTOR
FRED F. KLETT
BY Charles McClair
ATTORNEY

Patented May 7, 1935

2,000,234

UNITED STATES PATENT OFFICE 2,000,234

CAPSULE MAKING MACHINE

Fred F. Klett, Jersey City, N. J., assignor to Radio Corporation of America, a corporation of Delaware Application March 22, 1934, Serial No. 716,838

3 Claims. (Cl. 226—73)

My invention relates to a method and apparatus for manufacturing sealed metal capsules containing fluid and more particularly sealed metal capsules filled with mercury and suitable for use in the manufacture of certain types of mercury vapor electron discharge devices.

Sealed metal capsules filled with mercury have usually been made by hand. In the hand method of manufacture a short tube with a support tab or stirrup welded to it is closed at one end by pinching or folding, a definite weight of mercury deposited in it by a dropper, and the open end of the filled tube pinched together or folded, thus forming a sealed mercury filled capsule ready to be put into the electron discharge device. With this method of manufacture the elimination from the capsule of all of the air is very difficult, and the amount of mercury in different capsules may differ enough to affect the operation of the electron discharge devices in which the capsules are used. This hand method of manufacture is inaccurate and slow, and frequently the capsules burst, spilling the mercury and thus producing conditions which may be dangerous to the capsule makers.

The principal object of my invention is to provide an improved method and a simple apparatus by which sealed metal capsules completely filled with fluid, such as mercury, may be made more quickly, accurately and safely than by the hand methods heretofore used.

In accordance with my invention a piece of metal tubing at least as long as several capsules is filled with the fluid, such as mercury, which is to be contained in the sealed capsules. The filled tubing is first closed at one point, usually near one end, and then closed at predetermined places, spaced apart the length of a capsule, by pinching or squeezing the walls of the tubing together at these places in succession, starting from the place at which the tube is first closed, and proceeding toward the open end or ends of the tubing. Each pinched and flattened portion of the tubing is cut near the middle and thus from each piece of tubing several individual sealed metal capsules, each completely filled with mercury, are obtained. As a matter of convenience, supporting tabs for the finished capsules may be attached to the tubing intermediate the places which are later flattened, so that each finished capsule has a support tab. Sealed metal capsules may be quickly, accurately, and cheaply made in accordance with my improved method by simple apparatus, one form of which is hereinafter described.

The novel features which I believe to be characteristic of my invention are set forth with particularity in the appended claims but the invention will be best understood by reference to the following description in connection with the accompanying drawings in which:—

Figure 1 is a perspective view of a finished sealed metal capsule made in accordance with my invention.

Figures 2 and 3 show steps in the formation of the capsule shown in Figure 1.

Figure 4 is a plan view of one form of apparatus made in accordance with my invention for manufacturing capsules as shown in Figure 1.

Figure 5 is a front elevation of the apparatus shown in Figure 4.

Figure 6 is a vertical sectional view taken along the line 6—6 of Figure 5.

Figure 7 is a vertical sectional view taken along the line 7—7 of Figure 5.

Figure 8 is an enlarged partial view of the pinching rack and gear shown in Figure 5.

The sealed metal capsule produced in accordance with my invention and shown in Figure 1 comprises a short metal tube 10 pinched together at both ends, completely filled with fluid, such as mercury, and provided with a supporting tab or stirrup 11. In accordance with my invention these tubes 10 are, as shown in Figure 2, obtained from a piece of metal tubing as long as several capsules placed end to end. This long tubing may, for convenience, have fastened to it at predetermined points, preferably by welding, supporting tabs or stirrups 11, one for each sealed capsule. This tubing is filled with the fluid, such as mercury, with which the sealed capsules are to be completely filled, and preferably kept completely filled by connecting each end thru a flexible conduit such as a rubber pipe to a reservoir above the level of the tubing.

The filled tubing is then converted into a series of capsules end to end by closing it near one end, for example at the point 12, preferably by pinching the tubing until its walls are close enough together to prevent escape of the mercury, and then pinching and flattening the tubing at definitely spaced places 13 intermediate the stirrups, starting adjacent the point 12, and proceeding progressively from one place 13 to the next. This procedure drives the excess fluid toward the open end of the tubing, insures that each pellet is completely filled with mercury, and prevents the inclusion of air in the capsules. The excess fluid driven out of the open end of the tubing is caught in the reservoir connected to the tubing and is used in filling another piece of tubing.

By using tubing of uniform diameter and pinching it at uniformly spaced places 13 the same amount of fluid will be trapped in each capsule, thus eliminating the danger of bursting the capsule and also the necessity for weighing each charge of fluid for each capsule. The tubing is cut at the pinched or flattened places 13, thus providing filled individual capsules with tabs attached, such as shown in Figure 1, ready for use.

The preferred form of apparatus for making sealed metal capsules in accordance with my invention is shown in Figures 4 to 7 inclusive, and comprises a table 15 which supports pinching mechanism for progressively pinching the tubing and apparatus for keeping the tubing completely filled with mercury during the pinching operation.

The pinching mechanism for progressively pinching the tubing at definitely spaced places comprises a pair of cooperating toothed members mounted to bring their teeth together tip to tip and in succession to pinch or flatten progressively and at definitely spaced intervals a piece of tubing placed between the toothed members. In the particular form of apparatus illustrated the pinching mechanism has a bed plate 16 mounted on the table 15. One of the toothed pinching members is a horizontal pinching rack 17 mounted on the bed plate and having teeth 18 uniformly spaced to flatten the tubing at the places 13, and the other cooperating toothed member is a pinching gear 19 mounted to move bodily along the pinching rack and having teeth 20 spaced to register tip to tip with the teeth of the pinching rack 17. The pinching gear is moved bodily along the pinching rack with its teeth in registry with the teeth of the rack by a transversing mechanism in the form of a carriage 21 slidably mounted to move parallel to the rack in guides 22 on the base plate 16. As the carriage moves in the guides, the pinching gear, which is fixed to one end of a shaft rotatably mounted in bearings in the carriage 21, rotates so that the tip of each tooth of the pinching gear comes into registry with the corresponding tooth of the pinching rack as the gear is moved along the rack and the tubing which lies on and lengthwise of the rack and between the pinching rack and the pinching gear.

The positive rotation of the pinching gear 19 as the carriage moves along the pinching rack is produced by driving means comprising a driving gear 23, fixed to the pinching gear, preferably thru the shaft of the pinching gear, and in mesh with a driving rack 24 set parallel to the pinching rack to rotate the gear 23 and pinching gear 19 in a counter-clockwise direction as the carriage 21 moves from right to left. The carriage may be moved by a driving pinion 25 mounted on the carriage to mesh with the driving gear 23 and driven by a hand crank 26. Movement of the carriage is limited by stops 27 at either end of the bed plate 16.

The pressure between the tips of the teeth of the pinching rack 17 and pinching gear 19 can be adjusted, as best shown in Figure 6. The pinching rack 17 is preferably resiliently mounted on the bed plate 16 on compression springs 28, which are seated in recesses in the bed plate and tend to move the pinching rack bodily toward the pinching gear. The thrust of the springs 28, adjusted by adjusting screws 29 in the bottom of the recesses, determines the pressure between the gear and the rack. The movement of the rack 17 away from the bed plate under the thrust of the springs 28 is limited by studs 30, on the rack which project from the bottom of the rack thru holes in the bed plate, and have lock nuts 31 on their lower ends to engage the bed plate.

The tubing from which the capsules are to be made should be kept completely filled with the fluid to be contained in the capsules during the pinching operation. The preferred means for keeping the tubing filled comprises fluid containing reservoirs connected to opposite ends of the tubing. To fill the tube with fluid one or both of the reservoirs is raised above the level of the tube to cause the fluid to flow from the reservoir into the tubing. As best shown in Figures 4, 5 and 7 the reservoirs 40 are connected with the tubing by means of flexible conduits or rubber pipes 41, short tubes 42, and coupling members 43. One of the coupling members 43; for example, the one at the left end of the rack, may be moved lengthwise of the rack to permit the tubing to be inserted between the two coupling members and connected to them when laid on the rack 17. A convenient way to provide for this movement of the coupling member is to mount its short tube 42 in a clamp or holder 44 on the bed plate 16 so that it can be moved endwise at will. As best shown in Figures 5 and 7, the reservoirs, which are open to the air thru spring pressed covers and which are normally below the level of the pinching rack, may be raised above the level of the tubing on the pinching rack 17 by elevators 45 vertically slidable on supporting guides 46 and connected by cables or chains 47 passing over pulleys 48 to pedals 49 by which the elevators are raised and lowered.

A vent pipe 50 connected to and adjacent the right hand coupling member 43 vents air from the tubing when the tubing is being filled with fluid from the reservoirs. A trough 51 catches any mercury which may be spilled out on the pinching rack.

The sealed capsules are made on my apparatus by placing the long piece of tubing on the pinching rack 17 with the stirrups 11 between the teeth of the rack. To provide room between the rack and the gear for inserting the tubing between the gear and the rack, the pinching gear 19 preferably has a segment cut away to provide a flat bottomed recess 52 which will be adjacent the pinching rack when the pinching gear is at the right hand end of the pinching rack. The ends of the tubing on the rack are connected by the flexible conduits to the reservoirs 40, which are raised until the tube is completely filled and all air is eliminated from the tubing thru the vent pipe 50. The pinching gear is moved along the rack from right to left by turning the hand crank 26 in a clockwise direction, to pinch the tube 10 between the teeth 18 on the pinching rack and teeth 20 on the gear. As the pinching gear moves along the rack from right to left the tubing is progressively pinched and flattened between the tips of the rack teeth and the gear teeth at the places 13 as best shown in Figure 8, the excess fluid being forced from the tube into the left hand reservoir. As a result each capsule is completely filled with mercury, all air is eliminated, and each capsule contains the same amount of mercury. When the pinching gear reaches the left hand end of the rack, in which position the recess 55 of the gear is again adjacent the pinching rack, the coupling members 43 are disconnected from the crimped tubing, which is removed from the apparatus and cut up into the individual capsules shown in Figure 1 by cutting the crimped tubing at the pinched or flattened portions 13.

It is obvious that my invention is equally applicable to form fluid containing capsules of any size and for any purpose and is not limited to the formation of mercury containing capsules.

While I have indicated the preferred embodiment of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What is claimed to be new is,—

1. An apparatus for making sealed metal capsules containing fluid, and comprising means for holding a tube the length of a plurality of capsules, a fluid containing reservoir, means for connecting one end of the tube to said reservoir, means for raising the reservoir above the level of the tube for filling the tube with fluid from the reservoir, and means comprising a rack on which said tube is supported and a gear having registering teeth for progressively pinching the tube at predetermined places from one place on said tube toward the end of the tube connected to said reservoir to close the tube at the pinched places.

2. An apparatus for making sealed metal capsules containing fluid, and comprising a fluid containing reservoir, means for holding a tube the length of at least a plurality of said capsules and for coupling said tube to said reservoir, means for raising the reservoir to fill the tube with fluid from said reservoir, a rack for supporting said tube and a gear having teeth registering with the teeth on said rack and means for positively moving the gear over said rack for progressively pinching the tube at places spaced the length of a capsule from one place on the tube toward an open end of said tube.

3. An apparatus for making sealed metal capsules containing a fluid, and including a pinching rack for supporting a tube the length of at least a plurality of capsules, a pair of fluid containing reservoirs, means for connecting each end of the tube with one of said reservoirs, means for raising said reservoirs above the level of the tube to completely fill the tube with fluid from the reservoir, and a pinching gear cooperating with the pinching rack for pinching the tube progressively at predetermined places from one place on the tube to an open end of said tube and means for moving said pinching gear along the pinching rack.

FRED F. KLETT.